March 31, 1953 R. L. DOERRFELD 2,633,490

TAPE CONTROLLED CONVERTER

Filed June 30, 1950 2 SHEETS—SHEET 1

INVENTOR
ROBERT L. DOERRFELD
BY Emery Robinson
ATTORNEY

March 31, 1953 R. L. DOERRFELD 2,633,490

TAPE CONTROLLED CONVERTER

Filed June 30, 1950 2 SHEETS—SHEET 2

INVENTOR
ROBERT L. DOERRFELD
BY Emery Robinson
ATTORNEY

Patented Mar. 31, 1953

2,633,490

UNITED STATES PATENT OFFICE 2,633,490

TAPE CONTROLLED CONVERTER

Robert L. Doerrfeld, Ringwood, Ill., assignor, by mesne assignments, to Teletypesetter Corporation, Chicago, Ill., a corporation of Delaware Application June 30, 1950, Serial No. 171,388

5 Claims. (Cl. 178—17)

This invention pertains to signal controlled apparatus, and more particularly to improvements in selector devices therefor.

The principal object of the invention is to provide a selector mechanism having improved means for effecting selective operations therein.

Another object of the invention is to provide facilities for effecting an overlap between the tape sensing operation and the closure of contacts controlled thereby to increase the contact closure time.

More specifically, the arrangement according to the present invention is applicable to a translator or converter unit operated under the control of a perforated tape. The tape after being prepared on a tape perforator in response to code signals received over a signal line or in response to a keyboard, is inserted in the tape sensing or record reading portion of a translator unit or converter comprising a plurality of tape feeler or tape sensing members, each one of which corresponds to a position in the tape that may or may not be provided with a perforation, depending upon the particular code combination that is being read. Upon each momentary arrest of the tape the several tape feelers sense the code combination perforated in the particular positions, and during the next movement of the tape, the combination is transferred to a set of code bars through the instrumentality of the overlap mechanism according to the present invention. The code bars are provided with notches on both top and bottom edges thereof and in this manner they accommodate a double alignment of selectable elements. The selectable elements are oppositely disposed with respect to each other in scissors-like fashion, thus constituting two rows which are movable toward each other when urged into selected position by their respective springs. The oppositely disposed selectable elements are normally held apart by a spreader device. For each permutation of the code bars one of these selectable elements is placed, under the control of the spreader device, into selected position and when any particular one is thus selected it acts to close an electrical contact associated therewith.

A more complete understanding of the present invention may be had from the following description taken in conjunction with the accompanying drawings wherein.

Figures 1, 2:
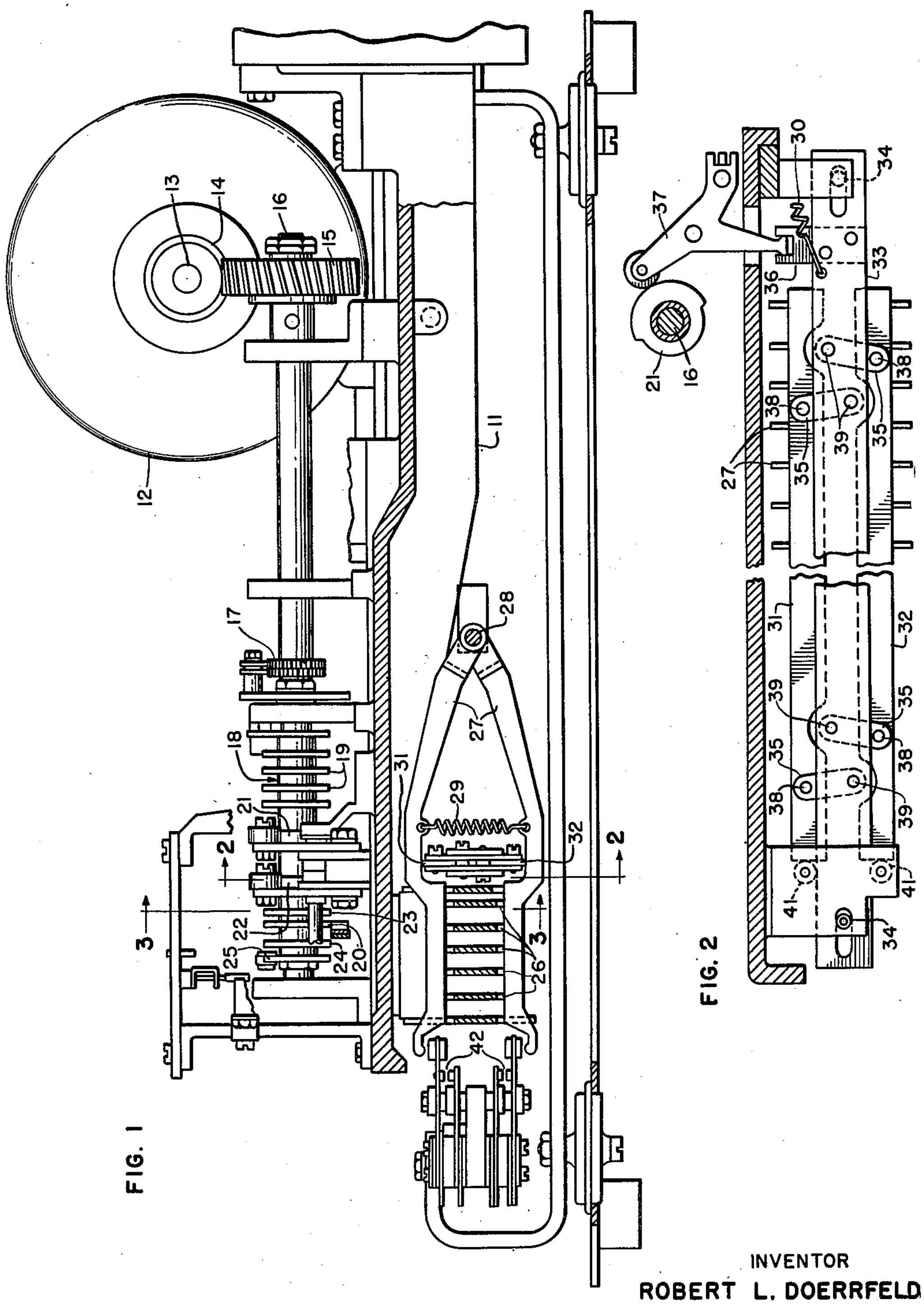
Fig. 1 is a side view, partly in section, of the translating unit embodying the present invention.
Fig. 2 is a sectional view taken on line 2—2 of Fig. 1.

Referring now to the drawings wherein like reference characters designate the same parts throughout the several views, the translating unit 11 embodying the present invention is utilized in a system disclosed in copending application Serial No. 52,520, filed October 2, 1948, by R. H. Halvorsen, which eventuated into U. S. Patent No. 2,578,185, issued December 11, 1951. The translating unit 11 described herein contemplates the embodiment of an improvement in the structure shown in Figs. 1 to 6 of said patent.

Mounted on the base 11 is a motor 12 having an armature shaft 13 on which is fixed a pinion 14 which meshes with a gear 15 fixed to a cross shaft 16. Operatively connected to shaft 16 through a clutch 17 is a cam sleeve 18 which carries a set of timing cams 19, a spreader cam 21, a code bar reset cam 22, a tape feed cam 23, a transfer lever bail cam 20, a sixth pin or tape-out cam 24, and a sensing lever cam 25.

Positioned in the base of the unit 11 are a plurality of code bars 26 (five in the present instance), which are notched along their upper and lower edges to cooperate with a plurality of selectable members 27 disposed on each side of the code bars 26 and pivoted on a common pivot 28. The members 27 are biased toward each other by a spring 29 common to each pair. Members 27 bear against blades 31 and 32 of a spreader device (Fig. 2).

The spreader device comprises a bar 33 slidably carried on a pair of pins 34. The slides 31 and 32 are connected to the bar 33 in a parallel motion manner by means of linkage elements or links 35. Fixed to bar 33 is an element 36, the upper edge of which is bifurcated to receive the end of the depending arm of a lever 37 adapted to be operated by the spreader cam 21.

Links 35 are pivotally articulated through pivots 38 to spreader bars 31 and 32. They are also pivotally articulated through pivots 39 to bar 33. When the follower roller of lever 37 drops off from the higher part to the lower part of cam 21, bar 33 is moved rightwardly (as viewed in Fig. 2), due to the tension imparted by springs 30. The extremities of members 27 cooperate with individual contacts 42 for the purpose described in said patent.

Figure 3:
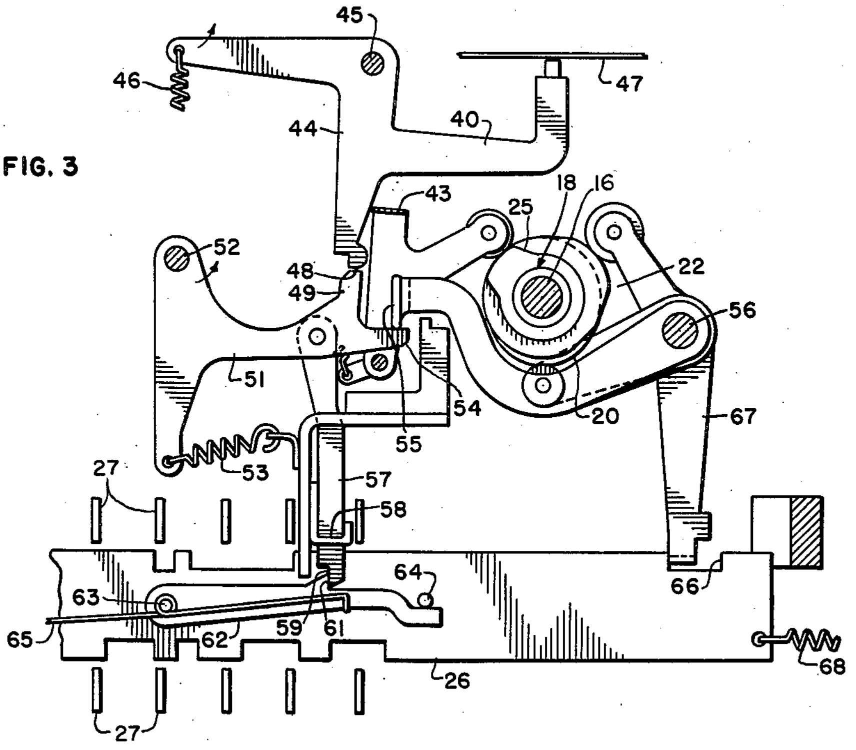
Fig. 3 is a sectional view taken on line 3—3, illustrating the storage device according to the present invention.

Referring to Fig. 3, a sensing lever bail 43 functions to operate a plurality of sensing levers 44 under the control of a sensing lever cam 25. Sensing levers 44 are allowed to rotate counterclockwise about a pivot by their individual springs 46. The sensing pins of arms 40 of sensing levers 44 feel for perforations in the tape 47. The lower extremities of sensing levers 44 have blocking surfaces 48 which cooperate with extensions 49 of a plurality of transfer levers 51 when those sensing levers 44, which do not penetrate a perforation in the tape, are blocked. The transfer levers 51 are urged in a counterclockwise manner about a pivot 52 by the action of their individual springs 53 which hold extensions 54 on the rightward extremities of transfer levers 51 against a bail 55. Bail 55 is movable about its pivot 56 by the action of transfer lever bail cam 20 fixed to cam sleeve 18. Pivotally attached to each of the transfer levers 51 is a latching lever 57 which is guided in its movement by a guide 58. The lower extremity of each latching lever 57 has a latching surface 59 which cooperates with a projection 61 of a corresponding latch member 62. Each latch member 62 is pivotally mounted at pivot 63 on corresponding code bars 26 and are biased in a counterclockwise direction against a stop 64 by the action of their individual springs 65. Code bars 26 have notches 66 at their rightward extremities to cooperate with a reset bail 67 controlled by the reset cam 22.

At a predetermined time during the cycle of rotation of shaft 16, a cam or clutch magnet operates a clutch trip bail (not shown) to render the clutch 17 effective to rotate the sleeve 18. The sensing lever cam 25 thereon functions to operate bail 43 to permit simultaneous counterclockwise actuation of tape feeler or sensing levers 44 (as viewed in Fig. 3) for sensing code perforations or indicia in the tape. Those sensing levers 44 which penetrate a perforation in the tape 47 will follow the bail 43, removing the blocking relation between blocking surfaces 48 of sensing levers 44 and extensions 49 of transfer levers 51. Bail 55, with its adjustably attached cam follower, is then rotated clockwise by action of the transfer lever bail cam 20. Those transfer levers 51, which are not blocked by the sensing levers 44, now rotate counterclockwise by action of their individual springs 53 and their pivotally attached latching levers 57 are raised until the latching surface 59 is out of engagement with the projections 61 of corresponding latch members 62 and the corresponding code bars 26, normally held in their leftward position, are, in timed relation to the tape sensing operation, released by the reset bail 67 for rightward movement by their individual springs 68, under control of the reset cam 22. Those code bars 26 which have not been released by latching levers 57 remain in the unselected left-hand position.

In timed relation to the setting of the code bars 26, the cam 21 will operate bail 37 to retract the blades 31 and 32 of the spreader device, thereby permitting springs 29 to draw the members 27 toward the code bars 26. In accordance with well known principles of permutation code selection, one of the members 27 will find an alignment of notches and will therefore be drawn further than the remaining members 27 to effect the closure of its associated contact 42. The closing of contact 42 selectively in this manner is analogous to such closure by the keys of a keyboard device.

With the arrangement according to the present invention an overlap is provided between the tape sensing operation and the code reset operations, whereby the sensing or reading of the next code signal is effected while the selectable bars 27 remain selected according to the preceding code signal to permit a longer closure of contacts 42.

Figure 4:
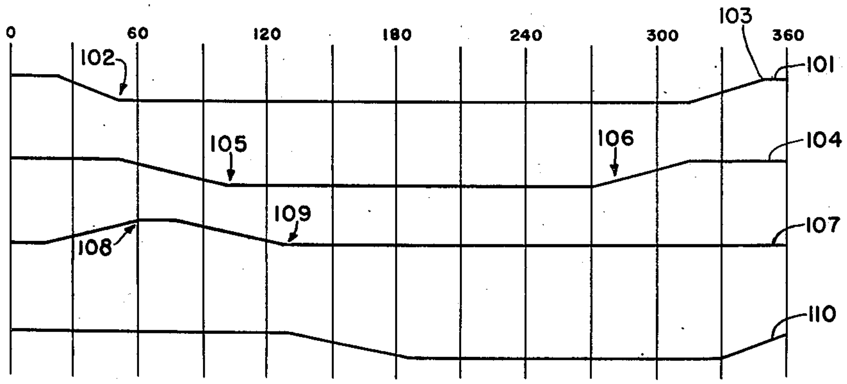
Fig. 4 is a timing chart showing the relative time of operation of the various cams in the apparatus, and illustrating the time in which the various functional operations are porformed.

Having reference to the cam diagram shown in Fig. 4, line 101 represents the timing of the sensing lever cam 25. At point 102 the sensing levers 40 are fully released by bail 43 to read the tape. At point 103 the levers 40 are returned to their nonreading position. Line 104 represents the timing of the transfer lever cam 20. At point 105, after the levers 40 have assumed their tape reading position, the levers 51 are released by bail 55 to assume their blocking relation with respect to levers 40 and to disengage latches 57 according to the code sensed in the tape 47. At point 106 the levers 51 are returned to their nonblocking position, and this occurs before the levers 40 are withdrawn from the tape.

Line 107 represents the timing of the code bar cam 22. At point 108 the code bars 26 are fully returned to their left-hand position, as shown in Fig. 3. At point 109 the latches 57 have been withdrawn and the code bars 26 assume their selected or rightward position. It is observed that this selection is continued until the point 108 in the next cycle is reached, thus providing an overlap. Line 110 represents the timing of the spreader cam which controls the selection of the levers 27 following the setting of the code bars 26.

Although the invention has been described with reference to a particular embodiment, it is to be understood that various modifications may be made without departing from the scope of the invention as defined by the appended claims.

What is claimed is:

1. In a selector, a set of feelers for sensing perforations in a control form, a corresponding set of members cooperable with said feelers, a corresponding set of code bars, and cooperating latch members on said members and said code bars, said latch members adapted to be yieldably related to facilitate selective operations, whereby said code bars are released for selective operation in accordance with the cooperative relationship between said feelers and said members determined by the perforations in said control form to thereby provide an overlap.

2. In combination, a plurality of contacts, a corresponding plurality of contact control members, a set of permutation elements for selectively conditioning said contact control members individually, a set of feelers for sensing perforations in a control form, a set of instrumentalities for receiving a code setting from said feelers, and cooperating latch members on said instrumentalities and said permutation elements, said latch members adapted to be yieldably related to facilitate selective operations, whereby said permutation elements are released for selective operation in accordance with the cooperative relationship between said feelers and said instrumentalities determined by the perforations in said control form to thereby provide an overlap.

3. In a selector, a set of feelers for sensing perforations in a control form, a corresponding set of instrumentalities cooperable with said feelers, a corresponding set of permutation bars, a latch element carried by each instrumentality, and a cooperating latch element carried by each permutation bar, said latch members adapted to be yieldably related to facilitate selective operations, whereby said permutation bars are selected in accordance with the cooperative relationship between said feelers and said instrumentalities determined by the perforations in said control form to thereby provide an overlap.

4. In a selector, a set of feelers for sensing perforations in a control form, a first bail member for controlling the operation of said feelers simultaneously, a set of instrumentalities cooperable with said feelers, a second bail member operable in timed relation with said first bail member for controlling the operation of said instrumentalities simultaneously, a set of permutation bars, a third bail member operable in timed relation with said first and second bail members for controlling the operation of said bars simultaneously, a latch element carried by each instrumentality, and a cooperating latch element carried by each permutation bar to facilitate the resetting of said feelers and said instrumentalities by said first bail and said second bail, respectively, prior to the resetting of said permutation bars by said third bail, whereby an overlap is provided.

5. In combination, a plurality of contacts, a corresponding plurality of contact control members, a set of permutation elements for selectively conditioning said contact control members individually, a set of feelers for sensing perforations in a control form, a set of instrumentalities for receiving a code setting from said feelers, a latch element carried by each instrumentality, a cooperating latch element carried by each permutation element, said latch members adapted to be yieldably related to facilitate selective operations, whereby said permutation elements are released for selective operation in accordance with the cooperative relationship between said feelers and said instrumentalities determined by the perforations in said control form, and means for restoring said feelers and said instrumentalities prior to the restoration of said permutation elements to provide an overlap.

ROBERT L. DOERRFELD.

REFERENCES CITED

The following references are of record in the file of this patent:

UNITED STATES PATENTS

| Number | Name | Date |
|---|---|---|
| 2,126,397 | Kleinschmidt ------ | Aug. 9, 1938 |

FOREIGN PATENTS

| Number | Country | Date |
|---|---|---|
| 427,321 | Great Britain ------ | Apr. 15, 1935 |